US008127332B2

(12) United States Patent
Michel et al.

(10) Patent No.: US 8,127,332 B2
(45) Date of Patent: Feb. 28, 2012

(54) SYSTEM AND METHOD FOR DYNAMICALLY TRANSMITTING PROGRAM SYSTEM INFORMATION FROM TELEVISION NETWORK TO STATIONS USING INFORMATION EMBEDDED IN AN HDTV SIGNAL

(75) Inventors: Kenneth J. Michel, Brightwaters, NY (US); Michael J. Strein, Oakdale, NY (US)

(73) Assignee: Disney Enterprises, Inc., Burbank, CA (US)

( * ) Notice: Subject to any disclaimer, the term of this patent is extended or adjusted under 35 U.S.C. 154(b) by 390 days.

(21) Appl. No.: 12/355,920

(22) Filed: Jan. 19, 2009

(65) Prior Publication Data

US 2009/0235311 A1  Sep. 17, 2009

Related U.S. Application Data

(60) Provisional application No. 61/036,538, filed on Mar. 14, 2008.

(51) Int. Cl.
*G06F 13/00* (2006.01)
*G06F 3/00* (2006.01)
*H04N 5/445* (2011.01)

(52) U.S. Cl. ............................ 725/54; 725/39; 725/40

(58) Field of Classification Search .................. 725/54, 725/40, 39
See application file for complete search history.

(56) References Cited

U.S. PATENT DOCUMENTS

| 6,744,917 | B1* | 6/2004 | Sadowski et al. | 382/162 |
|---|---|---|---|---|
| 6,785,903 | B1* | 8/2004 | Kuh | 725/50 |
| 7,134,133 | B1* | 11/2006 | Wugofski | 725/39 |
| 7,877,769 | B2* | 1/2011 | Corl | 725/39 |
| 7,877,771 | B2* | 1/2011 | Corl | 725/39 |
| 7,877,773 | B2* | 1/2011 | Corl | 725/39 |
| 2004/0017831 | A1* | 1/2004 | Shen et al. | 370/486 |
| 2006/0184994 | A1* | 8/2006 | Eyer et al. | 725/136 |
| 2007/0174876 | A1* | 7/2007 | Maggio et al. | 725/78 |
| 2009/0235305 | A1* | 9/2009 | Pugel | 725/33 |

OTHER PUBLICATIONS

SMPTE Standard SMPTE 334M-2000.

* cited by examiner

*Primary Examiner* — Pankaj Kumar
*Assistant Examiner* — Mulugeta Mengesha
(74) *Attorney, Agent, or Firm* — Smith Risley Tempel Santos LLC; Michael J. Tempel

(57) ABSTRACT

A system for dynamically transmitting recent program system information from a television network to an affiliate station using information embedded in an HDTV signal includes a program data server configured to provide current program system information protocol (PSIP) data, a network video programming source configured to provide network video programming, a data inserter configured to insert the PSIP data into vertical ancillary (VANC) space of a high definition television (HDTV) signal to develop a combined network video programming and PSIP data signal, and a transmission facility configured to transmit the combined network video programming and PSIP data signal.

7 Claims, 5 Drawing Sheets

SYSTEM AND METHOD FOR DYNAMICALLY TRANSMITTING PROGRAM SYSTEM INFORMATION FROM TELEVISION NETWORK TO STATIONS USING INFORMATION EMBEDDED IN AN HDTV SIGNAL

CROSS-REFERENCE TO RELATED APPLICATION

This application claims the benefit of the filing date of U.S. Provisional Application No. 61/036,538, filed on Mar. 14, 2008, entitled "Transmission Of Program System Information From Television Network To Stations Using Information Embedded In An HDTV Signal," the entire disclosure of which is hereby incorporated into this document be reference.

BACKGROUND

A television network typically provides programming to a large number of stations, sometimes referred to as "affiliates" or "affiliate stations." In addition to the actual programming, information relating to program information and scheduling data is required by the affiliate stations. Currently, this information is communicated verbally, via email, paper memos, alerts and/or from third party notification services, typically on a daily basis on pre-determined programming schedules. Some of this information may include recent or late changes to programming and/or programming data. This information may include program identifiers (IDs), TV ratings information, program title information, program start and stop times, and other relevant data.

Current programming technology dictates that over-the-air programming sent from a network to an affiliate station be provided in what is referred to as a "digital" format. Included in a digital format may be high definition programming, referred to as HDTV. Television stations are currently mandated by law to provide what is referred to as Program System Information Protocol (PSIP) data along with the digitally transmitted TV signal. This PSIP information is used by the TV, set top box, or other TV signal decoding device to provide an electronic programming guide (EPG). Further, additional information, such as the program rating, captioning services, second language, etc., are also provided to the viewer.

When airing local programming, an affiliate station typically receives their programming data from a commercial program data service, such as, for example, Tribune Broadcasting, or by manually entering the programming data into the program stream. However, when airing television network programming, for example, when the affiliate station is airing the television network signal, the affiliate station relies on the schedule delivered by the television network. Unfortunately, network programming may change, due to, for example, late-breaking news, a sporting event entering overtime, program cancellations, or other events that change the programming schedule very close, or even after air time. When such a change happens, there is currently no simple way of providing the updated program information to the affiliate station.

Therefore, there is a need for a way of efficiently and easily delivering updated program information to an affiliate station to provide automatic and automated updates to the affiliate station's programming guide system.

SUMMARY

Embodiments of the invention include a system for dynamically transmitting recent program system information from a television network to an affiliate station using information embedded in an HDTV signal, comprising a program data server configured to provide current program system information protocol (PSIP) data, a network video programming source configured to provide network video programming, a data inserter configured to insert the PSIP data into vertical ancillary (VANC) space of a high definition television (HDTV) signal to develop a combined network video programming and PSIP data signal, and a transmission facility configured to transmit the combined network video programming and PSIP data signal.

Other embodiments are also provided. Other systems, methods, features, and advantages of the invention will be or become apparent to one with skill in the art upon examination of the following figures and detailed description. It is intended that all such additional systems, methods, features, and advantages be included within this description, be within the scope of the invention, and be protected by the accompanying claims.

BRIEF DESCRIPTION OF THE FIGURES

The invention can be better understood with reference to the following figures. The components within the figures are not necessarily to scale, emphasis instead being placed upon clearly illustrating the principles of the invention. Moreover, in the figures, like reference numerals designate corresponding parts throughout the different views.

DETAILED DESCRIPTION

Figure 1:
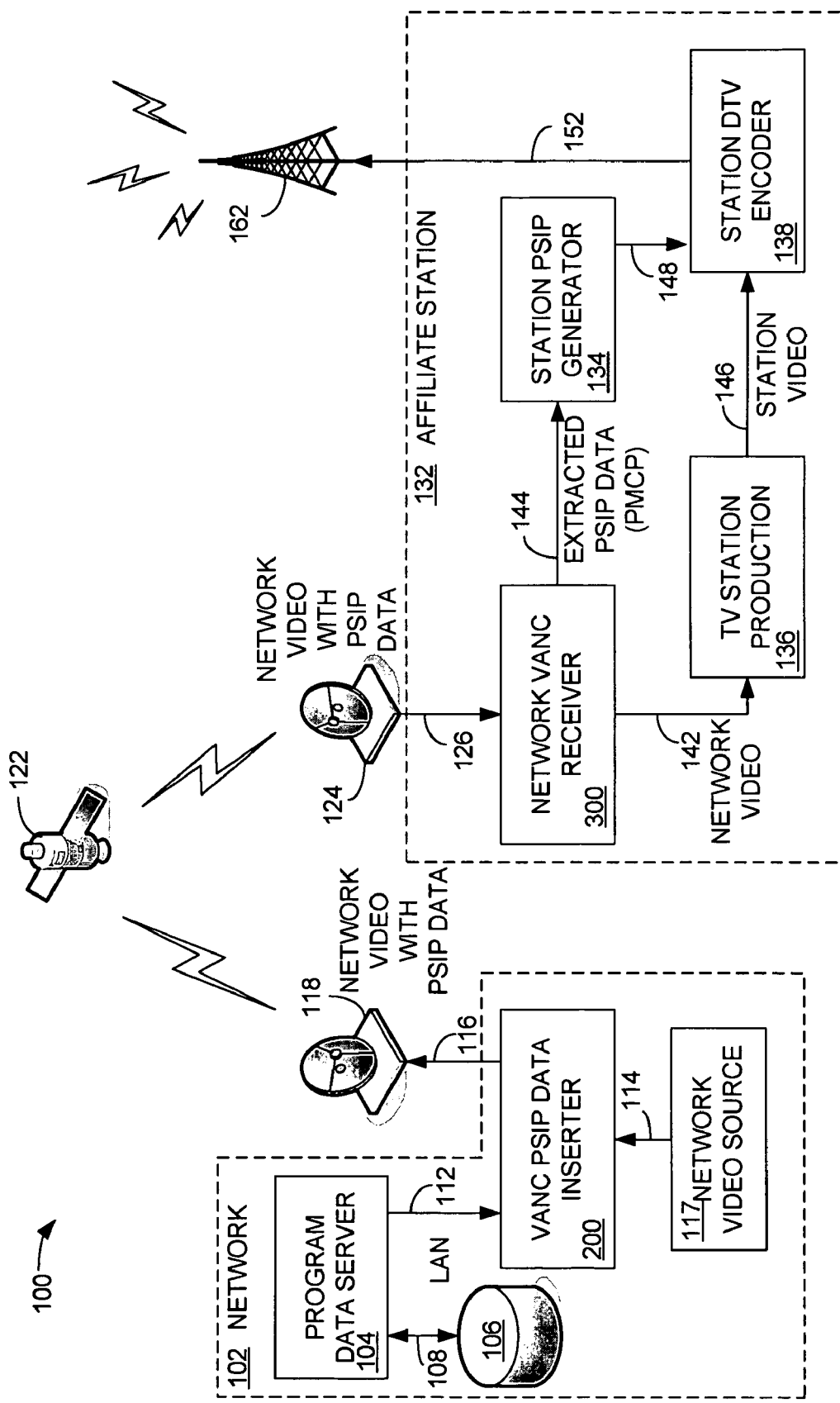
FIG. 1 is a block diagram illustrating an example of a system for transmitting program system information from a television network to an affiliate station using information embedded in an HDTV signal.

The system and method for dynamically transmitting program system information from a television network to an affiliate station using information embedded in an HDTV signal can be implemented in any digital television delivery system that transmits a high-definition (HD) television signal. The structure of the HD television signal can be used to transmit additional information, sometimes referred to ancillary data. In an embodiment, the HD television signal is used to transmit Program System Information Protocol (PSIP) data along with the digitally transmitted TV signal.

The system and method for dynamically transmitting program system information from a television network to an affiliate station using information embedded in an HDTV signal can be implemented in hardware, software, or a combination of hardware and software. When implemented in hardware, the system and method for dynamically transmitting program system information from a television network to an affiliate station using information embedded in an HDTV signal can be implemented using specialized hardware elements and logic. When the system and method for dynamically transmitting program system information from a television network to an affiliate station using information embedded in an HDTV signal is implemented in software, the software can be used to control the various components in a system and network associated with the program. The software can be stored in a memory and executed by a suitable instruction execution system (microprocessor). The hardware implementation of the system and method for dynamically transmitting program system information from a television network to an affiliate station using information embedded in an HDTV signal can include any or a combination of the following technologies, which are all well known in the art: discrete electronic components, a discrete logic circuit(s) having logic gates for implementing logic functions upon data signals, an application specific integrated circuit having appropriate logic gates, a programmable gate array(s) (PGA), a field programmable gate array (FPGA), etc.

The software for the system and method for dynamically transmitting program system information from a television network to an affiliate station using information embedded in an HDTV signal comprises an ordered listing of executable instructions for implementing logical functions, and can be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

In the context of this document, a "computer-readable medium" can be any means that can contain, store, communicate, propagate, or transport the program for use by or in connection with the instruction execution system, apparatus, or device. The computer-readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: a portable computer diskette (magnetic), a random access memory (RAM), a read-only memory (ROM), an erasable programmable read-only memory (EPROM or Flash memory) (magnetic), an optical fiber (optical), and a portable compact disc read-only memory (CDROM) (optical). Note that the computer-readable medium could even be paper or another suitable medium upon which the program is printed, as the program can be electronically captured, via for instance, optical scanning of the paper or other medium, then compiled, interpreted or otherwise processed in a suitable manner if necessary, and then stored in a computer memory.

FIG. 1 is a block diagram illustrating an example of a system 100 that can implement the system for dynamically transmitting program system information from a television network to an affiliate station using information embedded in an HDTV signal. The system 100 includes a television network 102, a transmission system including a satellite communication uplink station 118, a communication satellite 122, a satellite communication downlink station 124 and an affiliate station 132. Details of the transmission system, including the satellite communication uplink station 118, the communication satellite 122, and the satellite communication downlink station 124, which can be capable of bi-directional communication, are not described herein as they are known to those skilled in the art. Further, other transmission systems, such as, for example, terrestrial transmission systems, wired or wireless transmission systems, or other transmission systems, can be implemented in the system for dynamically transmitting program system information from a television network to an affiliate station using information embedded in an HDTV signal.

The network 102 includes a program data server 104 in communication with a database 106 over a bidirectional communication channel 108. The database 106 stores program data information, commonly referred to as Program System Information Protocol (PSIP) data. The PSIP data includes information used by an affiliate station and a receiving device, such as a television, set top box, or other television display device, to provide what is referred to as an electronic program guide (EPG). The electronic program guide contains a listing of available programming. Further, additional information, such as the program rating, captioning services, second language, etc., may also provided to the viewer.

The current, or recently updated, PSIP data is transferred over a communication channel 112 from the program data server 104 to a VANC PSIP data inserter 200. The communication channel 112 can be, for example, a local area network (LAN), or any other communication network within the television network 102. In an embodiment, the VANC PSIP data inserter 200 is a communication element that can insert data into the vertical ancillary (VANC) space of a high-definition television (HDTV) video signal. The insertion of information into the vertical ancillary space of an HDTV signal is described in SMPTE (The Society Of Motion Picture And Television Engineers) standard 334M-200 entitled "Vertical Ancillary Data Mapping for Bit-Serial Interface," which is incorporated herein by reference.

The VANC PSIP data inserter 200 also receives network video source programming over connection 114 from a network video source 117. In accordance with an embodiment of the system for dynamically transmitting program system information from a television network to an affiliate station using information embedded in an HDTV signal, the VANC PSIP data inserter 200 dynamically combines the most updated, recent and relevant PSIP data received from the program data server 104 over connection 112 with network video programming supplied by the network video source 117 over connection 114. This combined network video programming and PSIP data signal is sent over connection 116 to the satellite communication uplink station 118.

The satellite communication uplink station 118 transmits the combined network video programming and PSIP data signal via satellite 122 to the satellite communication downlink station 124. The satellite communication downlink station 124 communicates the received combined network video programming and PSIP data signal over connection 126 to a network VANC receiver 300.

In addition to the network VANC receiver 300, the affiliate station 132 includes a television station production facility 136, a station PSIP generator 134 and a station digital television (DTV) encoder 138. The network VANC receiver 300 separates the network video programming signal from the most updated, recent and relevant PSIP data, as will be described below. The network video programming is provided over connection 142 to the television station production facility 136. The PSIP data is provided over connection 144 to the station PSIP generator 134. The connections 142 and 144 can be a local area network (LAN), or any other communication channel or communication bus within the affiliate station 132.

The station PSIP generator 134 generates a station PSIP data signal including the most updated, recent and relevant PSIP data sent by the network 102. This PSIP data is used by the TV, set top box, or other TV signal decoding device to provide a dynamically updated electronic programming guide (EPG). The station PSIP generator 134 transmits the station PSIP data signal over connection 148 to the station DTV encoder 138. The television station production facility 136 generates the station video signal over connection 146 which is also provided to the station DTV encoder 138.

The station DTV encoder 138 combines the station PSIP data signal with the station video signal and provides a combined station PSIP data signal and station video signal over connection 152 to a transmission facility 162. In an embodiment, the transmission facility 162 can be, for example, and over-the-air broadcast facility that wirelessly transmits the affiliate station television signal to television receivers. Alternatively, the transmission facility 162 can be a cable television (CATV) broadcast facility that transmits the affiliate station television signal over a cable, or other wired or wireless, distribution system. In accordance with an embodiment of the system for dynamically transmitting program system information from a television network to an affiliate station using information embedded in an HDTV signal, the transmitted signal includes a dynamically updated electronic programming guide (EPG) having the latest, most recent and relevant network PSIP data, thereby allowing the affiliate station the ability to broadcast the latest network programming information.

Figure 2:
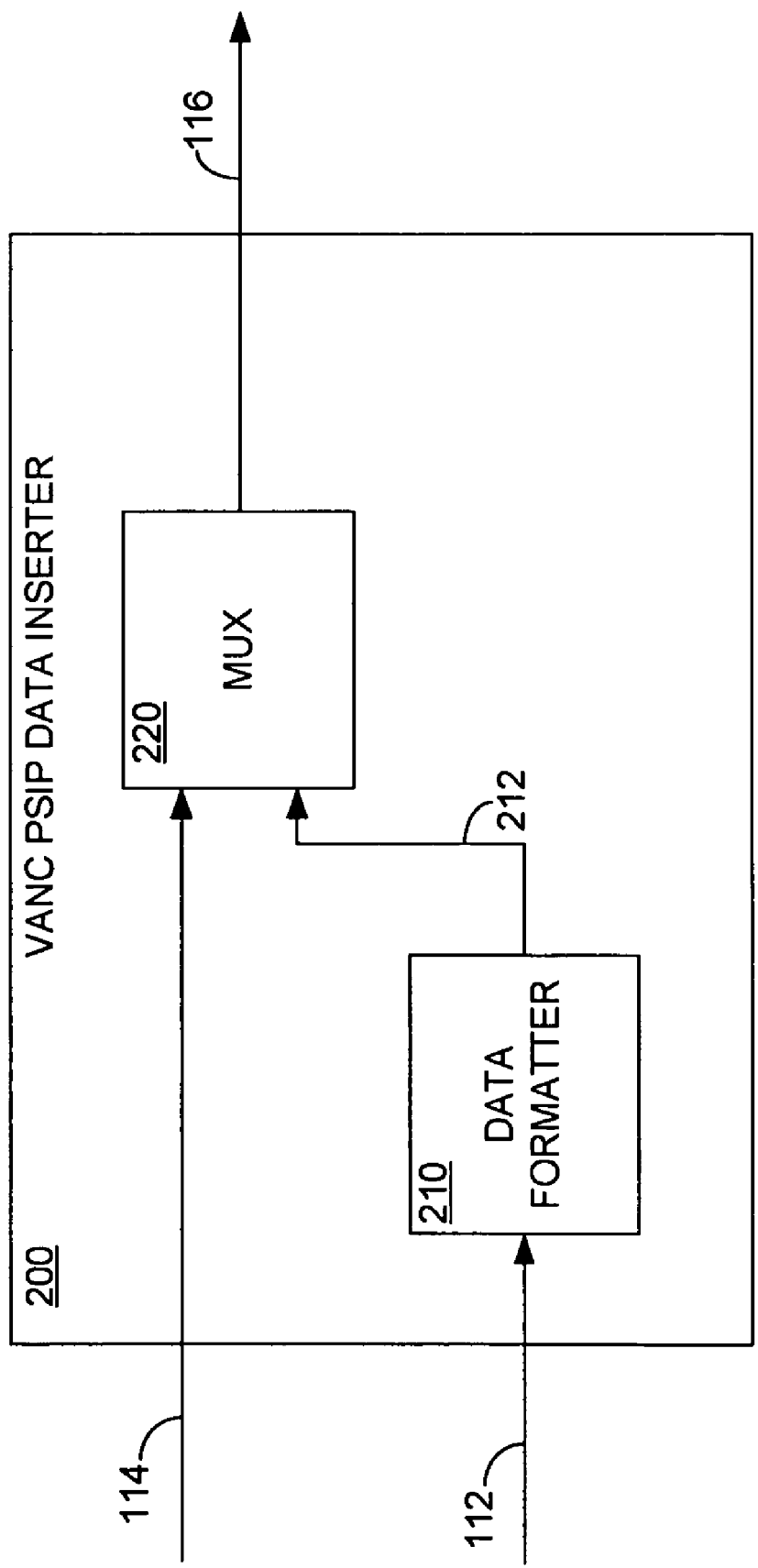
FIG. 2 is a block diagram illustrating an embodiment of the VANC PSIP data inserter of FIG. 1.

FIG. 2 is a block diagram illustrating an embodiment of the VANC PSIP data inserter of FIG. 1. The VANC PSIP data inserter 200 includes a data formatter 210 and a multiplexer 220. The multiplexer 220 receives at a first input the network video programming signal over connection 114 (FIG. 1). The data formatter 210 dynamically receives the most updated, recent and relevant PSIP data signal having the latest program data from the program data server 104 (FIG. 1) over connection 112. The program data server 104 dynamically delivers the most recent and relevant PSIP data in an appropriate format, such as, for example, a comma delimited database format, to the data formatter 210. Alternatively, the most recent and relevant PSIP data can be delivered in other formats. The data formatter 210 receives the PSIP data in the appropriate format, e.g., the comma delimited database format, and assigns the PSIP data the field identifier or field identifiers that the station PSIP generator 134 associated with the network VANC receiver 300 will recognize for each of the particular fields. Examples of fields are program type, program name, program length, etc. The data formatter 210 formats the PSIP data signal and provides the formatted PSIP data signal over connection 212 to a second input of the multiplexer 220.

In an embodiment, the multiplexer 220 inserts the PSIP data signal into video line 12 using the data ID (DID) 0x53, and using the secondary data ID (SDID) 0x01, as per SMPTE 334M-200 guidelines for the insertion of user-defined data into an HDTV signal. Alternatively, other lines in the video stream can be used to insert the PSIP data signal into the video signal, as provided by SMPTE 334M-200 guidelines. In an embodiment, the multiplexer 220 also parses the PSIP data such that it will not overflow the data buffers (not shown) used for satellite transmission. In an embodiment, the multiplexer 220 parses the PSIP data, thus typically limiting the PSIP data transmission to less than approximately 75 bytes per video frame. The output of the multiplexer 220 is the combined network video programming and PSIP data signal on connection 116.

Figure 3:
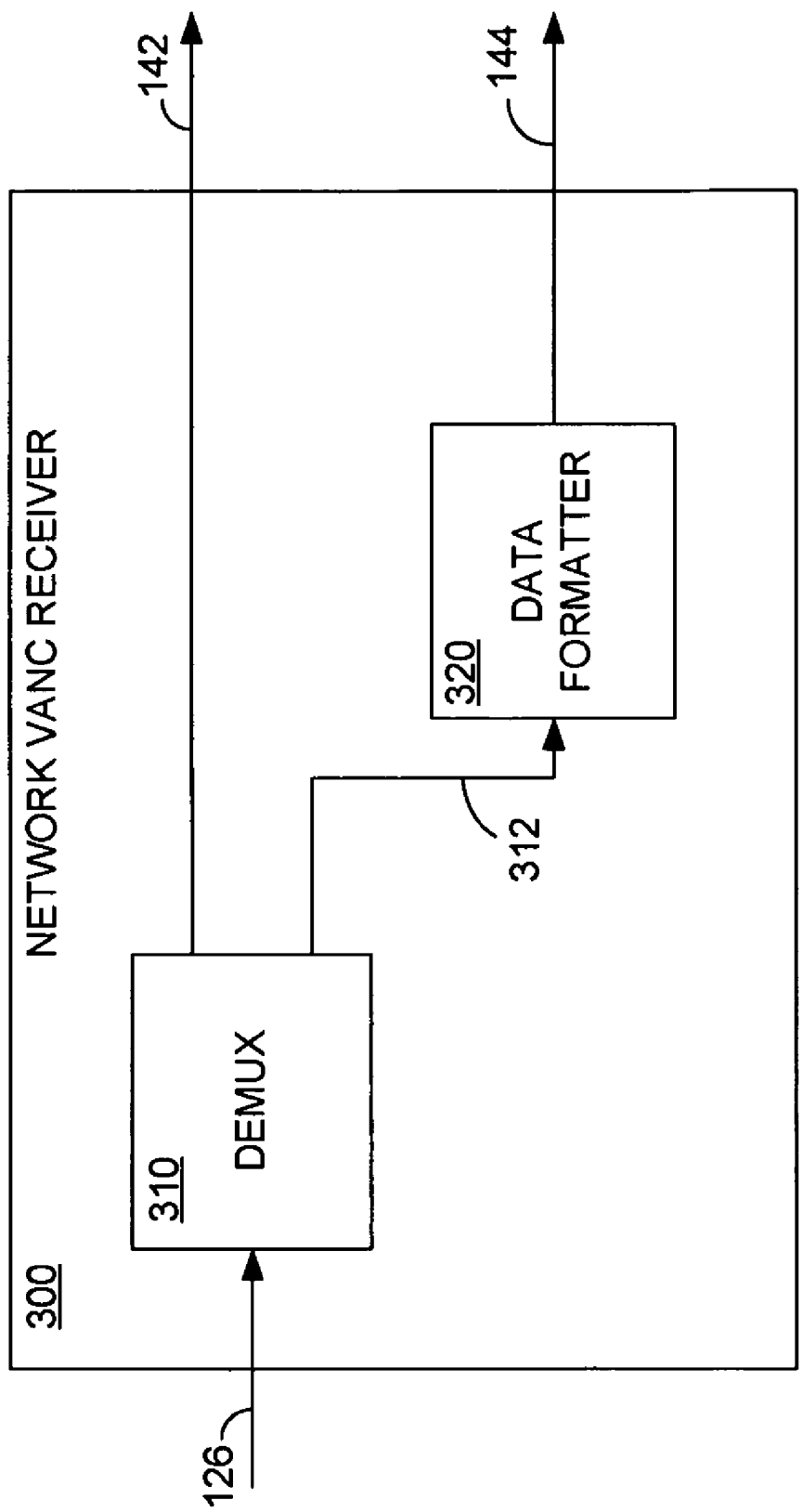
FIG. 3 is a block diagram illustrating an embodiment of the network VANC receiver of FIG. 1.

FIG. 3 is a block diagram illustrating an embodiment of the network VANC receiver of FIG. 1. The network VANC receiver 300 includes a demultiplexer 310 and a data formatter 320. The received combined network video programming and PSIP data signal is received over connection 126 by the demultiplexer 310. The demultiplexer 310 extracts the PSIP data signal from video line 12, DID 0x53, SDID 0x01, or from whatever location the PSIP data was inserted by the multiplexer 220 (FIG. 2), and provides the extracted PSIP data over connection 312 to a data formatter 320. The data formatter 320 takes the received PSIP data with the field identifiers assigned by the data formatter 220 (FIG. 2) for the type of data, e.g., program type, program name, program length, etc. In an embodiment, the data formatter 320 then buffers the PSIP data until cogent packets are available for assembly. The data formatter 320 then formats the PSIP data into a format referred to as Programming and Metadata Communication Protocol (PMCP), which can be interpreted by the station PSIP generator 134. In an embodiment, the PMCP format is defined by the ATSC in standard A/76x, and allows the integration of various information sources used to compile PSIP data, and is used by the station PSIP generator 134 to provide the station PSIP data signal. Updates and revisions to the A/76x standard are also contemplated herein. The demultiplexer 310 also provides the network video program signal over connection 142, as described above.

Figure 4:
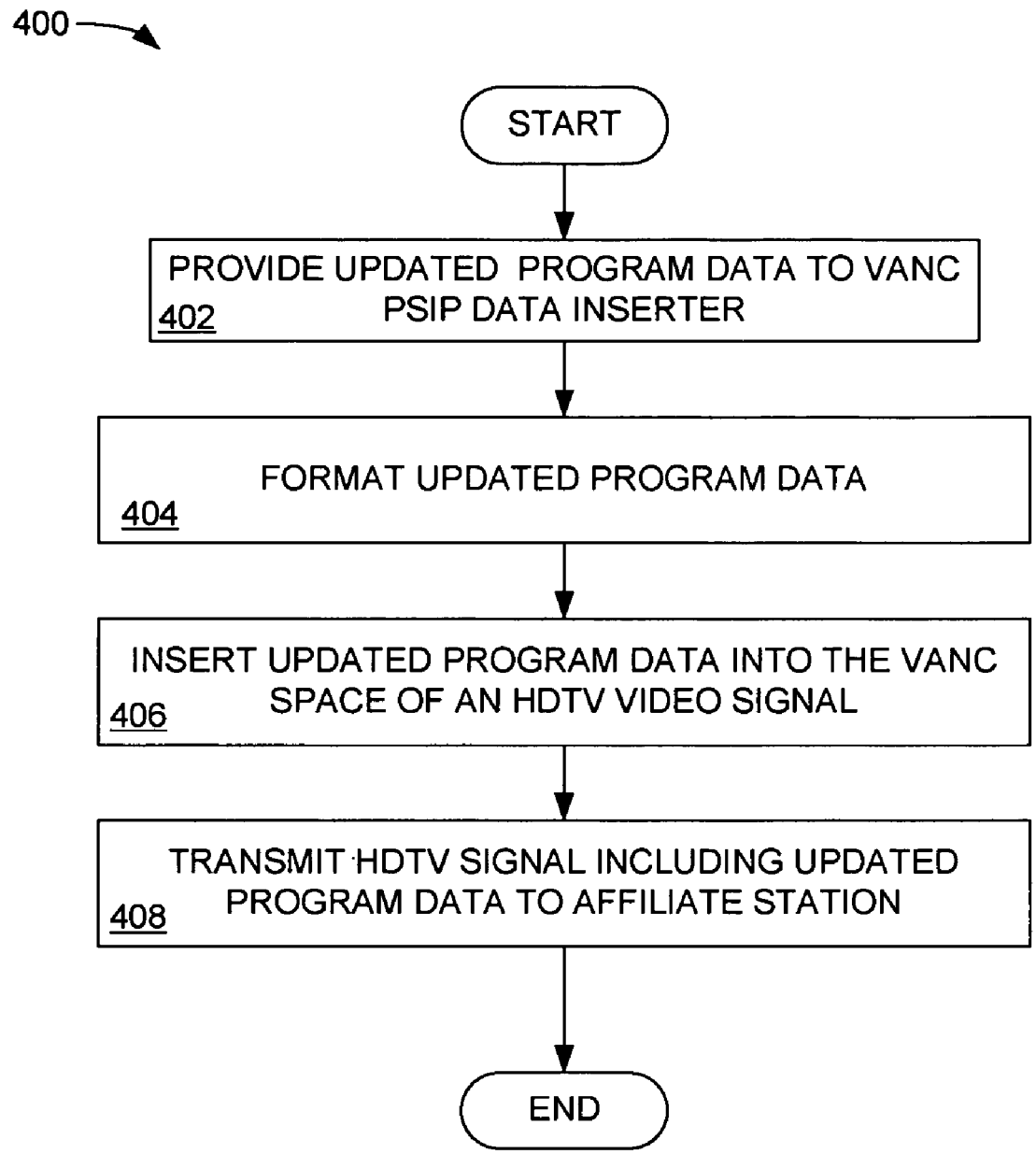
FIG. 4 is a flowchart describing the operation of an embodiment of the VANC PSIP data inserter of FIG. 2.

FIG. 4 is a flowchart 400 describing the operation of an embodiment of the VANC PSIP data inserter 200 of FIG. 2. In block 402 the most updated, recent and relevant programming PSIP data is dynamically supplied by the program data server 104 (FIG. 1) to the VANC PSIP data inserter 200. In block 404, the VANC PSIP data inserter 200 formats the supplied PSIP data. In block 406, the VANC PSIP data inserter 200 inserts the supplied PSIP program data into the vertical ancillary (VANC) space of a high definition television (HDTV) video signal. In block 408, the HDTV signal including the combined network video programming and PSIP data signal is transmitted to an affiliate station.

Figure 5:
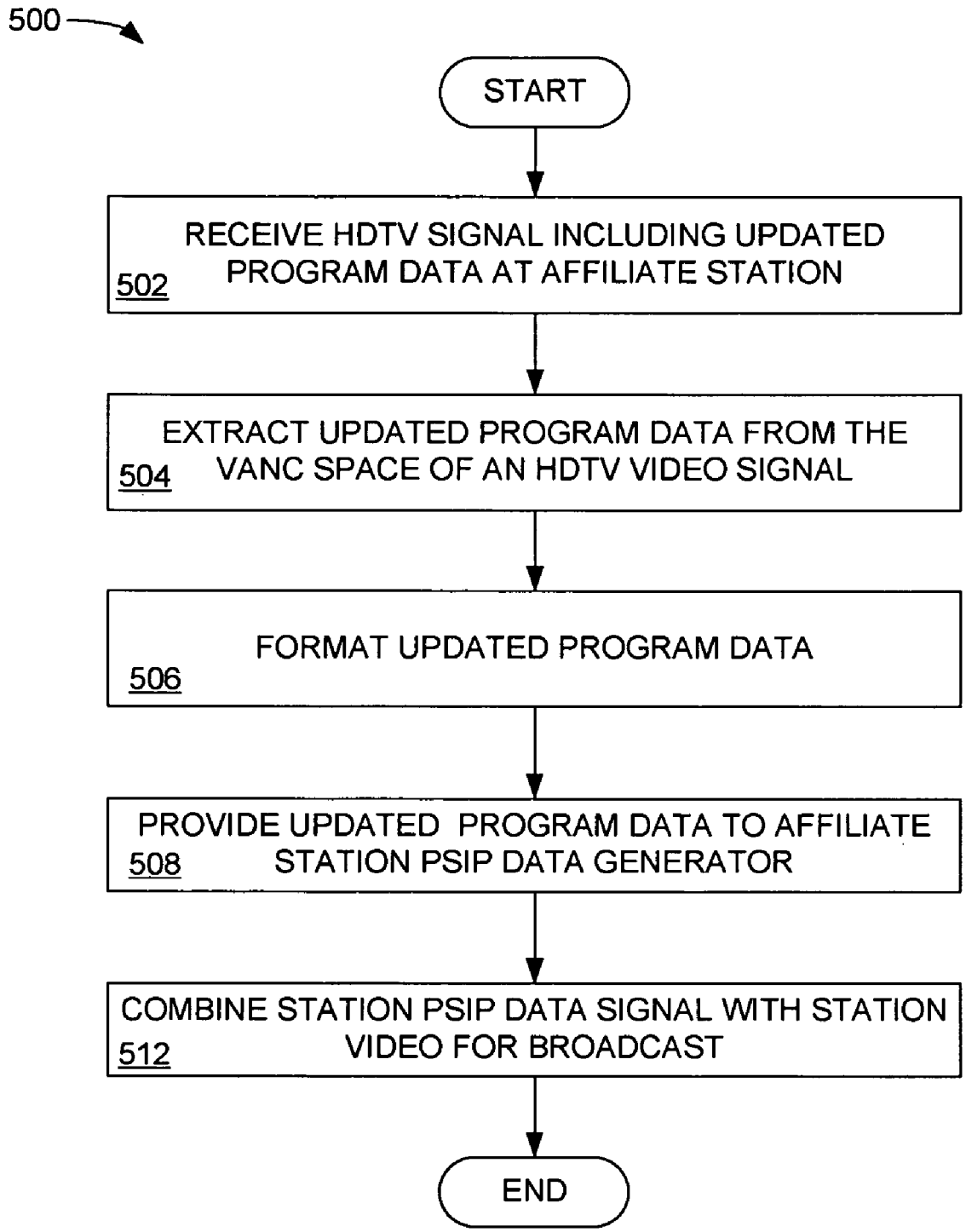
FIG. 5 is a flowchart describing the operation of an embodiment of the network VANC receiver of FIG. 3.

FIG. 5 is a flowchart 500 describing the operation of an embodiment of the network VANC receiver 300 of FIG. 3. In block 502, an HDTV signal including the combined network video programming and PSIP data signal is received at an affiliate station 132 by the network VANC receiver 300. The network video programming is provided over connection 142 (FIG. 3) to the television station production facility 136 (FIG. 1).

In block 504 the most recent and relevant PSIP data signal is extracted from the vertical ancillary (VANC) space of an HDTV video signal by the demultiplexer 310. In block 506, the data formatter 324 formats the received PSIP data into PMCP format. In block 508, the most recent and relevant PSIP data is provided to the affiliate station PSIP generator 134 (FIG. 1) by the network VANC receiver 300 in PMCP format. In block 512 the station DTV encoder 138 combines the station PSIP data signal and the station video signal for transmission via the broadcast facility 162.

While various embodiments of the invention have been described, it will be apparent to those of ordinary skill in the art that many more embodiments and implementations are possible that are within the scope of the invention.

What is claimed is:

1. A system for dynamically transmitting updated program system information from a television network to an affiliate station using information embedded in an HDTV signal, comprising:

a program data server configured to provide updated program system information protocol (PSIP) data;

a network video programming source configured to provide network video programming;

a data inserter configured to insert the PSIP data into video line 12, data ID (DID) 0x53, secondary data ID (SDID) of the vertical ancillary space of the HDTV signal of vertical ancillary (VANC) space of a high definition television (HDTV) signal to develop a combined network video programming and PSIP data signal, the data inserter comprising a data formatter configured to format the PSIP data and a multiplexer configured to combine the network video programming and PSIP data; and a transmission facility configured to transmit the combined network video programming and PSIP data signal.

2. The system of claim 1, in which the PSIP data is used to provide a dynamically updated electronic programming guide (EPG) having the latest, most recent and relevant PSIP data.

3. A system for dynamically receiving updated program system information from a television network using information embedded in an HDTV signal, comprising:

a network receiver configured to receive a combined network video programming and PSIP data signal, the PSIP data signal carried in the vertical ancillary (VANC) space of a high definition television (HDTV) signal, the network receiver configured to extract the PSIP data signal and the network video programming, the network receiver comprising a demultiplexer configured to extract PSIP data from video line 12, data ID (DID) 0x53, secondary data ID (SDID) 0x01 of the vertical ancillary space of the HDTV signal, and a data formatter configured to format the extracted PSIP data into a Programming and Metadata Communication Protocol (PMCP) format;

a station PSIP generator configured to receive the extracted PSIP data signal and develop a station PSIP data signal;

a television production facility configured to receive the network video programming;

a station digital television (DTV) encoder configured to combine the station PSIP data signal and the network video programming; and a transmission facility configured to transmit the combined station PSIP data signal and the network video programming.

4. The system of claim 3, in which the PSIP data signal is used to provide a dynamically updated electronic programming guide (EPG) having the latest, most recent and relevant PSIP data.

5. A method for dynamically transmitting updated program system information from a television network to an affiliate station using information embedded in an HDTV signal, comprising:

providing updated program system information protocol (PSIP) data;

providing network video programming;

inserting the PSIP data into video line 12, data ID (DID) 0x53, secondary data ID (SDID) 0x01 of vertical ancillary (VANC) space of a high definition television (HDTV) signal to develop a combined network video programming and PSIP data signal, the inserting comprising formatting the PSIP data and combining the network video programming and PSIP data; and transmitting the combined network video programming and PSIP data signal.

6. The method of claim 5, further comprising providing a dynamically updated electronic programming guide (EPG) having the latest, most recent and relevant PSIP data.

7. A system for dynamically transmitting ancillary data from a television network to an affiliate station by embedding the ancillary data in an HDTV signal, comprising:

a program data server configured to provide ancillary data;

a network video programming source configured to provide network video programming;

a data inserter configured to insert the ancillary data into vertical ancillary (VANC) space of a high definition television (HDTV) signal to develop a combined network video programming and ancillary data signal, in which the ancillary data is inserted into video line 12, data ID (DID) 0x53, secondary data ID (SDID) 0x01 of the vertical ancillary space of the HDTV signal; and a transmission facility configured to transmit the combined network video programming and ancillary data signal.

* * * * *